Patented Nov. 3, 1936

2,059,791

UNITED STATES PATENT OFFICE 2,059,791

SYNTHETIC RESIN PRODUCT AND PROCESS

Paul M. Hennegan, Cincinnati, Ohio, and Raymond A. Swain, Bellevue, Ky.; said Swain assignor to said Hennegan No Drawing. Application January 11, 1935, Serial No. 1,445

21 Claims. (Cl. 134—26)

This invention relates to an improved polyhydric alcohol-polybasic acid resin and an improved method of producing the same.

The present application constitutes a continuation in part of our application Serial Number 579,956, filed December 9, 1931, and our application No. 654,762, filed February 1, 1933.

Our primary object is to provide an improved fusible soluble resin of the alkyd type. Broadly, the purpose is accomplished by combining an infusible, insoluble alkyd type resin with a fusible, soluble polyhydric alcohol resin having free hydroxyl groups, thus producing a novel resin complex of improved characteristics, as will be pointed out later. In some cases depending upon the product desired, an oily ester having free hydroxyl groups may be used in the process in lieu of the fusible soluble resin.

Preferably, in accordance with the invention, an infusible insoluble alkyd type resin is produced by reacting together phthalic anhydride and glycerol, and, if desired, certain modifying substances, these materials being heated together until an infusible insoluble resin results; a fusible soluble glycerol resin is prepared by heating together glycerol and a resinifying carboxylic organic acid, which may be polybasic or monobasic, or may be a mixture of polybasic and monobasic carboxylic organic acids, these materials being taken in appropriate proportions to produce a resin having a large number of free hydroxyl groups and being heated together until a resin is produced which is non-liquid at room temperatures; and then combining the infusible insoluble resin with the fusible soluble resin while the latter is in molten condition, heating being continued until the reaction is completed, thus producing a fusible soluble resin which is non-liquid at room temperatures and which possesses improved characteristics, not found in fusible soluble alkyd type resins produced in accordance with known methods. In the case of an ester having available hydroxyl groups, produced by combining a drying oil acid and glycerine, as in an example given later, the compound is of an oily nature and is liquid at room temperatures. It will combine, however, with the infusible insoluble alkyd resin to form an improved alkyd resin.

The novel method, as preferably practiced, results in a resin which is solid at room temperatures, but which is fusible and which is soluble in the solvents for the primary fusible soluble resin which is employed to react upon the infusible insoluble alkyd type resin to produce the novel complex. On the other hand, the infusible insoluble resin employed is not soluble in known solvents for the primary fusible soluble resin.

One feasible method of procedure is to produce a fusible soluble alkyd type resin, and use a portion of this resin to produce, by continued heating, an infusible insoluble alkyd type resin, and then combine the infusible insoluble resin with the fusible soluble resin while the latter is in molten condition. Another feasible and perhaps more convenient procedure is to produce a batch of fusible soluble resin in one vessel and a batch of infusible insoluble alkyd type resin in another vessel; and then combine the batches and react them together by continued application of heat.

Still another feasible procedure is to produce an infusible insoluble alkyd type resin; then mix therewith materials which will form a fusible soluble resin or an oily ester, having free hydroxyl groups; and then heat all of the materials together until the fusible soluble resin, or the oily ester, as the case may be, forms and combines with the infusible insoluble resin.

Infusible insoluble resins

The infusible insoluble alkyd type resin to be employed in the process may be produced by reacting together, for example, phthalic anhydride and glycerol, taken in proportions, by weight, of 3 of the former to 1 of the latter, two of the former to 1 of the latter, or 1 of the former to 1 of the latter, or in such variations of proportions as may suggest themselves for particular purposes to those skilled in the art. However, the infusible insoluble resin may also be produced by using, in addition to a polybasic acid and a polyhydric alcohol, modifying materials, as in some of the fusible soluble alkyd type resins hereinafter set forth.

Without wishing to be bound by any precise theory of the manner in which the fusible soluble resin combines with the infusible insoluble alkyd type resin, we may state that numerous tests show rather conclusively that chemical combination occurs; and we give it as our view that the available hydroxyl groups of the primary fusible soluble resin unite with the hydrogens of carboxyl radicals of the primary infusible insoluble resin, and that this, in turn, permits any free organic carboxylic acid present in the fusible soluble resin to combine with any available hydroxyl groups in the infusible insoluble resin. In the reaction, condensation occurs, water splitting off. Such a reaction accounts for the very great reduction of the acid number which is characteristic of the improved resin. The improved resin which results is a novel resin complex of higher molecular weight, higher viscosity, and usually a far lower acid number than are possessed by fusible soluble alkyd type resins produced by known methods.

Fusible soluble resins

A fusible soluble alkyd type resin, for example, may be formed by cooking together a polyhydric alcohol and a polybasic acid, preferably at a temperature of about 200° C., until a sample cooled to room temperature becomes clear, homogeneous, and non-liquid. The following table, based upon one series of experiments, illustrates relative reactivities of such resins formed from phthalic anhydride and glycerine, in terms of the amount of insoluble infusible alkyd type resin (made by combining one, two or three parts of P. A. with 1 part G.) which will apparently be dissolved in or combined with the fusible soluble resin when the materials are heated with the fusible soluble resin in molten condition. The table shows with what per cent. of its own weight, in each instance, the fusible soluble resin will combine. In the table, the parts are taken by weight.

| Fusible soluble resins | | | Infusible insoluble resin combinable with fusible soluble resin |
|---|---|---|---|
| | Phthalic anhydride | Glycerol | |
| | | | Per cent |
| (1) | 3 | 1 | About 12½ |
| (2) | 2 | 1 | 15 |
| (3) | 1.6 | 1 | 50 |
| (4) | 1 | 1 | 50 |
| (5) | 1 | 2 | 66 |
| (6) | 1 | 4 | 80 |

The foregoing table illustrates that, progressively, the fusible soluble alkyd type resin becomes more and more reactive as the proportion of phthalic anhydride to glycerine is reduced and the free hydroxyl groups of the fusible soluble resin are correspondingly increased. It does not follow, however, that it is desirable to employ too large a proportion of glycerine. This is for the reason that the fusible soluble resin tends to become unduly soft when the proportion of glycerine is unduly increased; and this, in turn, affects the quality of the improved alkyd type resin which results from combining the two primary resins. That is to say, the use of too much glycerine may produce a primary fusible soluble resin which is sticky, or even liquid at room temperature, and this tends, in turn, to produce the improved resin in a form which is less desirable for many purposes. In practice, we have found (3), (4), and (5) more desirable than the others.

It is noted that the molecular weight of glycerine is 92, while that of phthalic anhydride is 148.

Additional formulae for producing fusible soluble alkyd type resins suitable for the process are as follows:

(7) Phthalic anhydride_____lbs.___ 582
    Glycerine _____lbs.___ 552
    Naphthalene flakes_____lbs.___ 145
    Cresylic acid _____gals.___ 18¾
    Tannic acid_____lbs.___ 4
    Stearic acid_____lbs.___ 15

(8) Phthalic anhydride_____gms.___ 200
    Glycerine _____ccs.___ 100
    Cresylic acid _____ccs.___ 10
    Deodorized fish oils_____ccs.___ 50

(9) Glycerine_____Pounds 34
    Phthalic anhydride_____ 58
    Boiled linseed oil_____ 24
    Sardine or menhaden deodorized fish oil (known commercially as Falkover heavy)_____ 8
    Rosin _____ 50

It will be seen from the foregoing that alkyd type fusible soluble resins suitable for use in the process may be produced by using glycerine and phthalic anhydride in varying proportions and, where desired, in connection with other ingredients. The ingredients may be mixed together and heated gradually to about 200° C. and maintained at that temperature until non-liquid at room temperature. Ordinarily, the fusible soluble resins become quite solid at room temperature, but they may be more or less soft, or even sticky, depending upon the materials and proportions used.

In producing the primary infusible insoluble polybasic acid-polyhydric alcohol resins, the most desirable practice is to not employ much more than 1.6 parts phthalic anhydride to one part of glycerine; and on the other hand, not to employ more than about 2 parts glycerine to one part phthalic anhydride. Ordinarily, it is desirable to use about equimolecular proportions in forming the infusible insoluble resin for the purpose of conveniently producing it in hard, resistant condition. The use of too high a percentage of glycerine may prevent the resin from being carried to the infusible stage; also, the use of drying oils or their fatty acids, the use of rosin, or the use of a combination of rosin and oils (as in Example (9)) may prevent the formation of an infusible insoluble resin; or, although the infusible insoluble resin may be formed by proper application of heat, may render the same incapable of combining, as in Example (8), with the fusible soluble resin.

*Other fusible soluble resins or oily esters having free hydroxyl groups*

For the purpose of the process, fusible soluble resins and oily esters having free hydroxyl groups, may be formed by combining glycerol, for example, with resinifying carboxylic organic acids other than those commonly known as polybasic acids. For example, rosin and glycerine may be employed; abietic acid (the chief ingredient in rosin) and glycerine may be employed; and fatty acids derived from drying oils may be combined with glycerine, for example, to produce the fusible soluble resin or the oily esters having free hydroxyl groups. Further examples of compounds having free hydroxyl groups and adapted to combine with infusible insoluble alkyd type resins may be obtained from the following formulae, the parts being taken by weight:

(10) Abietic acid _____ Grams 302
     Glycerine _____ 92

This fusible soluble resin is hard and brittle at room temperatures.

The abietic acid may be replaced by rosin, or other similar natural resin, by employing the proper proportion, it being noted that rosin ordinarily contains about 85% of abietic acid.

(11) Linseed oil fatty acid_____ Pounds 140
     Glycerine _____ 46

In this instance, the compound is an oily ester having free hydroxyl groups and is liquid at room temperatures.

*Other fusible soluble alkyd resins*

In the following, the parts are taken by weight, and are to be regarded as examples, since the proportions may be varied greatly.

| (12) Rosin acid | Linseed oil fatty acid | Glycerine | Phthalic anhydride |
|---|---|---|---|
| Parts | Parts | Parts | Parts |
| 100 | 8 | 68 | 59 |
| 100 | 8 | 39 | 30 |

In this instance, the fusible soluble resin is somewhat sticky or plastic at room temperatures.

| (13) | Glycerine | Phthalic anhydride | Rosin |
|---|---|---|---|
| | Parts 184 | Parts 148 | Parts 356 |

In this case, the fusible soluble resin is hard and brittle at room temperature.

In the last formula it is preferred to cook the glycerine and phthalic anhydride at about 200° C. until bubbling ceases, and then add the rosin and cook preferably at 225–275° C. until a sample cooled to room temperature is clear, homogeneous and hard. If desired, the rosin reaction may be catalyzed. For example, one may add 12 parts China-wood oil and ⅛ part to ¼ part zinc oxide; or HCl gas, for example, may be bubbled through the mixture while the cooking proceeds.

In combining abietic acid and glycerine, for example, the ingredients may be cooked in a closed vessel, equipped with reflux condenser, at a temperature of 200° C.–240° C., thus permitting escape of water and return of glycerine. The water formed is allowed to escape and the glycerine is returned to the vessel.

In converting the convertible fusible soluble alkyd type resins to infusible insoluble alkyd type resins, the temperature employed preferably is above 225° C. In small batches, the temperature may be raised to 300° C. for a limited period of time, but should not be continued long at a high temperature after the material has definitely passed to the infusible insoluble stage.

Where drying oils are used in producing the improved resin, it may be desirable to add them after the infusible insoluble resin has been combined with the fusible soluble resin and continue the cooking until the drying oil is thoroughly dissolved in or combined with the improved resin. As an example, one may take 100 gms. of the improved resin (the combined product) and combine the same with 64 gms. of raw linseed oil by heating the mixture at 200° C. to 250° C. until solution has been completed. Resin produced wholly from Example (7) is not suitable for such admixture, however.

It has been found, also, that when a natural resin acid of the character of abietic acid has been employed in producing the fusible resin which is later combined with the infusible resin, the complex readily admits the use of vegetable oils to produce varnishes and paints having any desired "oil length". Instead of linseed oil, one can incorporate other oils, such as perilla, soya bean, castor, fish oils such as menhaden, etc. Thus, the paint or varnish may be so constituted as to give the best results in any particular field where its use is desired.

All of the fusible soluble resins given in the preceding examples are soluble in:
Acetone
Ethyl acetate
"Cellosolve" (monoethyl ether of ethylene glycol), etc.

Where drying or semi-drying oils or their fatty acids, or natural resins having the qualities of rosin, or the resin acids, such as abietic acid, are employed in making the fusible resin, such resin becomes soluble, also, in such solvents as:
Toluol
Naphtha
Xylol
Turpentine
Turpentine substitutes The infusible insoluble resins employed are insoluble in any known solvents of the fusible soluble resins.

The improved alkyd type fusible and soluble resin produced by the process herein described is soluble in the solvents for the particular primary fusible soluble resin employed in the manufacture of the improved alkyd-type resin.

As has been indicated, the use of drying and semi-drying oils, the fatty acids thereof, natural resins and resin acids, such as rosin and abietic acid, renders the improved alkyd type resin soluble in or miscible with vegetable oils generally, including the drying and semi-drying oils.

The improved alkyd type resin may be produced and allowed to solidify. It may then be kept in stock indefinitely and used as a base for preparing lacquers, varnishes, paints, etc. Mixed with desirable solvents, the improved resin may be used as an ordinary lacquer; mixed with suitable solvents, powdered metals, and/or pigments, the improved resin furnishes a paint which is admirably adapted for use in situations where the paint is exposed to high heat, as for example in painting automobile engines, exhaust manifolds, etc.; mixed with drying oils and powdered metals and/or pigments, the resin furnishes a base for paints which may be used for maintenance purposes, such as painting metal fences, bridges, etc.

The improved alkyd type fusible soluble resin has, as indicated above, a higher molecular weight and a higher viscosity than fusible soluble alkyd type resins produced by known processes. Thus, the improved resin, when dissolved in a suitable solvent and having incorporated therewith powdered metals and/or pigments, if desired, will produce (after baking) a heavier film than will be produced from known fusible soluble alkyd type resins. An interesting phenomenon is that which occurs when the improved paint containing powdered aluminum, aluminum-bronze, or the like, is applied to, for example, an exhaust manifold. When this is subjected to a heat of about 800° F., it is found that, notwithstanding the fact that the fusion temperature of aluminum is around 1100° or 1200° F., the metal is fused and forms a continuous coating which adheres tenaciously to the metal pipe. It seems that the charring or carbonizing action which occurs as a characteristic of the improved resin is sufficient to produce a quick, high heat which fuses the metal in the paint and causes it to form a film on the metal base.

The acid number of the improved fusible alkyd type resin is markedly low, as contrasted with ordinary fusible alkyd type resins. We have found it possible to produce a primary fusible alkyd type resin with an acid number of 10–12. When, however, such a primary fusible resin is combined with an infusible insoluble alkyd type resin, the resultant product will have an acid number of say 3 or 4. When glycerides, such as drying oils, are introduced into the complex comprising the improved resin, the result is an extremely low acid number. Ordinarily, it is as low as 1 or 2. When this complex is dissolved in a solvent, the low acid character renders it possible to mix with the solution aluminum bronze, copper bronze, and even easily oxidizing pigments, such as MnO₂, in a ready-mixed paint. Such paints can be kept for long periods without losing the characteristics of freshly mixed paints. In the same manner, basic pigments may be incorporated in the paints, which is quite contrary to the teaching of experts in this particular art. In like manner, ready-mixed maintenance paints for various purposes may be manufactured, shipped, and kept for indefinite periods, such paints containing pulverulent metals, oxidizing pigments, basic pigments, or the like, together with oils if desired.

Referring to (7), it may be stated that in our experience the use of naphthalene tends to retard the reaction and enable the condensation to the fusible stage to be quite fully effected without danger of premature gelation during the cooking. On the other hand, tannic acid and stearic acid appear to have a certain value as condensing agents, tending to shorten the heating period. Formula (7) has proven highly satisfactory in commercial use in producing both the fusible stage and the infusible stage resins and, ultimately, the improved fusible soluble resin complex. Mixed with solvents and pulverulent aluminum, aluminum bronze or the like, and, if desired, with pigments, highly satisfactory paints for use where subjected to high heat are produced. When cresylic acid is employed in moderate amount, it takes the place, perhaps, of a certain amount of phthalic anhydride. Both the cresylic acid and the naphthalene flakes are believed to aid in giving continuity of film when the paint or lacquer is spread upon the surface to be protected. In aluminum paint for automobile engines, however, the chief protecting value over long periods appears to reside mainly in the use of aluminum, or such metal alloy as may be used in the paint. It has been found that the metal will not flake, peel, or become soapy subsequent to application to the part to be protected, whereas aluminum paints formed from soluble alkyd type resins produced by ordinary processes have not proven satisfactory.

While, as indicated by the table given above, infusible insoluble alkyd type resin may be combined in widely varying proportion with fusible soluble glycerol resin, we have found it most desirable in practice to produce a fusible soluble resin which is fairly hard at room temperature, and combine therewith an infusible insoluble alkyd type resin produced by the use of such polybasic acids as will give a highly resistant infusible insoluble resin. As indicated, phthalic anhydride serves the purpose admirably. The infusible insoluble resin, however, may be produced without the necessity for an extended period of heating. That is, it may be produced in such manner that bubbling creates a more or less porous condition, enabling the infusible material to be dispersed in a short time in the molten fusible resin, thus facilitating chemical reaction and shortening the period required for completion thereof. Large lumps of the infusible resin thus produced may be easily broken up by blows. On the other hand, large lumps will ultimately become dispersed in and combine with the molten fusible resin, under continued application of heat.

The oily ester having free hydroxyl groups, produced in accordance with (11), reacts with the infusible alkyd resin when subjected to heat in the manner stated with reference to combining fusible soluble resin with infusible insoluble resin. The same is true of the fusible soluble resin produced in accordance with (12). With respect to both (11) and (12), the improved resin produced by combining the compound having available hydroxyl groups with infusible insoluble alkyd resin is sticky or plastic at room temperature.

While, in making the infusible insoluble resin, the resin may be formed rather quickly from the fusible soluble resin, say within one to several hours, depending upon conditions, and depending upon the degree of heat used, it is not desirable to continue long the application of high heat after the resin has become definitely infusible and insoluble.

While it is preferred to employ phthalic acid or its anhydride, and glycerol for the purpose of producing an infusible insoluble alkyd resin for use in the present process, any equivalents known in the art suitable for producing an infusible insoluble alkyd resin which will combine with a glycerol ester having free hydroxyl groups may be employed.

Anhydrides may be employed. In any case, the ingredients are to be taken in suitable proportions, as will be understood by those skilled in the art.

While it is preferred to employ glycerol in producing an ester having available hydroxyl groups which will combine with an infusible insoluble alkyd resin in the present process, any substitute for glycerol known in the art which will serve the purpose may be employed without departure from the invention. In practice, it is desirable to employ a polyhydric alcohol which will not be unduly expensive and which will yield the desired results, in accordance with the teachings given above.

It may be noted that, aside from the production of a fusible soluble alkyd type resin of improved characteristics, the present process is one which may be practiced with great facility in a factory, without danger of the batches "going wrong". It has not been found possible to carry the esterification of a fusible soluble alkyd type resin produced by ordinary methods to a sufficiently advanced stage to yield a product which is comparable in its characteristics with the improved fusible soluble alkyd type resin produced by the present process. Any attempt to produce such a high molecular weight as is possessed by the improved resin complex will result in gelation and ultimate infusibility and insolubility, thus putting the material in condition where it can not be usefully employed in lacquers, varnishes, and paints.

The improved fusible soluble alkyd type resin will, when carried to an infusible insoluble state, give a higher yield than is obtainable from a fusible soluble alkyd type resin produced by ordinary processes under as nearly as possible comparable conditions. It follows that the improved resin varnish will produce a greater residue after baking (customary in industrial finishes of the alkyd type) than an ordinary fusible soluble alkyd type resin finish will produce, the varnishes having an equal solids content. Careful experimental tests have shown that the infusible alkyd type resin, when dissolved in molten fusible soluble glycerol resin, will not revert to the known fusible soluble material. To the contrary, a new complex of higher molecular weight is formed by the combination. When infusible insoluble alkyd type resin is produced by continuing the heating for a prolonged period after initial gelation, the product ordinarily has a low acid number, which may range possibly from 2 to about 5. The acid number which results from combining a substantial proportion of infusible insoluble alkyd type resin with fusible soluble glycerol resin is, however, decidedly lower than would be obtainable by simply dispersing the infusible insoluble resin in the fusible soluble resin. That is, in combining infusible insoluble resin with a primary fusible soluble resin, the drop in the acid number is decidedly lower than could possibly be expected from a mere dispersion of infusible insoluble resin in primary fusible soluble resin. Experiments have shown that the acid number may drop, when fusible soluble resin and infusible insoluble resin are combined in proportions of 2 parts by weight of the former to 1 part by weight of the latter, to about ⅕ the acid number of the primary fusible soluble resin itself.

*Viscosities*

It has been stated that the improved fusible soluble alkyd type resin possesses a higher viscosity than does a fusible soluble alkyd type resin produced by ordinary processes. For illustration, equal parts by weight of glycerine and phthalic anhydride were formed into a fusible soluble resin; equal parts by weight of the same materials were formed into an infusible insoluble resin; and then two parts (by weight) of the former resin were combined with one part of the latter resin. Varnishes were then formed from the primary fusible soluble resin and from the improved fusible soluble resin, by dissolving in "Cellosolve", so that each varnish had a solid content equal to 25% of the varnish. The improved varnish showed a viscosity of 17 centipoises; and the other varnish showed a viscosity of 12 centipoises. In another test, similar varnishes were prepared so as to have a solid content of 38%; and in this case, the improved resin varnish showed a viscosity of 56 centipoises and the other resin varnish showed a viscosity of 22 centipoises.

In practicing the improved process, it is not essential that the primary fusible resin which is to be used to combine with the primary infusible insoluble alkyd type resin shall be formed preliminarily, in a separate batch. It is possible simply to introduce the infusible insoluble resin and the ingredients of the primary fusible resin into a vessel, using proper proportions, and then apply heat until the primary fusible resin forms and then continue the heat until the primary infusible insoluble alkyd type resin is apparently completely dissolved in the molten fusible resin, when it will be found that the improved fusible soluble alkyd type resin has been produced by actual chemical combination between the two primary resins.

In the appended claims, the primary fusible resin, which may or may not be generally known as the alkyd type, may sometimes be referred to as a fusible soluble synthetic glycerol resin, or ester, having free hydroxyl groups. For simplification, the claims, or some of them, may mention glycerine, or glycerol, but such claims should be understood to include known polyhydric alcohol equivalents. Again, in the claims, the expression "resinifying carboxylic organic acids" should be understood to include both polybasic acids and monobasic acids of this character.

It is to be understood that stirring may be resorted to to facilitate the formation of any and all of the resins.

If desired, any suitable substitute for cresylic acid may be used. Commercial cresylic acid contains para, meta, and ortho cresol. The commercial grade is sufficiently cheap, and is satisfactory.

Special plasticizers may be used, if desired. They are not essential, generally, especially where drying oils and/or resin are used in the complex. Castor oil, cod liver oil, diethyl phthalate, oil of myrrbane, essential oils, etc., may be used as plasticizers, if required.

Naphthalene, while apparently retarding the reaction during the formation of the fusible soluble resin, apparently serves to lessen the amount of phthalic anhydride required.

As has been pointed out, the improved fusible soluble alkyd type resin is soluble in such solvents as "Cellosolve", acetone, and ethyl acetate. When, for example, abietic acid, fatty acid, or both, or rosin, is used in large proportion in the fusible soluble resin (see (10),(11), and (13)), the improved resin resulting from combining infusible insoluble resin therewith is soluble, also, in solvents for nitrocellulose. Such improved resins, when in solution, are therefore compatible with nitrocellulose, thereby widening the range of uses. When compounded into a lacquer with nitrocellulose, for example, a lacquer is produced which is well adapted for interior finishes. Such films would be noted for their extreme brilliance, gloss, and hardness, and a very important feature would be their inertness towards basic pigments and the stability of such pigments incorporated in the solution; also, increased durability, when contrasted with known materials. When natural resins and/or oils are introduced into such solutions, the solutions are well adapted for use in exterior situations, as on motor vehicle bodies, or in other situations where the film will be exposed to the effects of weather. As has been pointed out, basic pigments may be employed in ready-mixed varnishes and paints. Thus, manganese dioxide, zinc oxide, lead peroxide, and other pigments are available for use in ready-mixed paints, etc., thus making available to the public ready-mixed paints of this character. Ordinary rosin is referred to in some of the formulae given above. Suitable natural resin substitutes, such as copal resin, may be employed.

Improved resins produced by using (7), (8), or (9), are not suitable for compounding with cellulose derivative resins. Improved resins in which (10) or (13) is employed in the manufacture are suitable for interior purposes, but may be rendered suitable for exterior purposes by incorporating a drying oil, for example, 100 lbs. of the improved resin to 32 lbs., or more, of raw linseed oil.

The improved fusible soluble alkyd type resin is highly inert with respect to ultra-violet light. By suitable manipulations, known in the art, water-soluble or ether-soluble dyes can be precipitated on the improved resin (using the resin as a mordant). Thus, so-called lakes can be used in pigmenting printing inks and the like, or producing in lacquers, paints, or the like, colors which ordinarily are fugitive, but which become fast colors, due to the fact that the improved resin is highly opaque with respect to ultra-violet light. This feature is of importance, also, in connection with pigmented lacquers, enamels, and paints where a fugitive dye or pigment is used.

It should be added that when an oil of the drying or semi-drying type is used in place of a fatty acid, the oil generally being largely composed of tri-glycerides, the reactive or available hydroxyl groupings for the fusible soluble resins, or the oily esters, can be obtained by including phthalic anhydride, or other suitable acid, and glycerine, with the drying oil.

From the description given, it will be understood that the gist of the invention, broadly, lies in combining an infusible insoluble alkyd resin with a soluble glycerol ester having available hydroxyl groups (or the constituent materials which will form such an ester), which will unite with hydrogen ions of carboxyl groups of the infusible insoluble resin; also, that the soluble glycerol ester may be in the form of a liquid (an oily ester), or may be in the form of a soluble glycerol resin, which ordinarily will be solid at room temperature, but which may be more or less sticky or plastic at room temperature. It is important, however, that the ester which is to be combined with the infusible insoluble resin shall have available hydroxyl groups for the purpose stated. It will be understood, therefore, that for the purpose of the process any suitable infusible insoluble alkyd resin may be formed in accordance with methods known to the art, and that any suitable glycerol ester having available hydroxyl groups may be formed in accordance with methods known to the art; and that such infusible insoluble resin may be chemically combined with such glycerol ester having available hydroxyl groups in accordance with the teachings herein.

In certain of the appended claims a class consisting of enumerated acids is specified. It is to be understood, however, that known equivalents of the enumerated acids capable of being esterified by glycerol or the like to yield an ester having available free hydroxyl groups which will enable such ester to combine with the primary infusible insoluble resin in the process are to be regarded as within the scope of such claims. Phthalic anhydride is an example of a resin-forming polybasic aromatic organic acid and glycerine is an example of an alcohol having at least three hydroxyl groups. Such substances must be present in dominating amounts in order to form the primary infusible insoluble resin employed in the present process, although modifying substances may be introduced. For example, Formula (7), supra, can be used to produce a primary infusible insoluble resin which will combine with a fusible soluble glycerol resin having available free hydroxyl groups to enable the reaction to be effected; and, as has been indicated, the same formula can be used to produce a primary fusible soluble resin having available free hydroxyl groups which will combine chemically with the primary infusible insoluble resin prepared from the same formula. Glycerol, or an equivalent of glycerol, must be used in preparing the primary infusible insoluble glycerol phthalate resin, or its equivalent, and also must be used in preparing the primary soluble ester having available free hydroxyl groups, which ester is to combine chemically with the primary infusible insoluble resin.

The term "fusible soluble ester", as used herein, is intended to include such esters as a glycerol-linseed oil acid ester which is normally liquid at room temperature.

The foregoing detailed description is given for clearness of understanding only, and no unnecessary limitations should be understood therefrom, but the appended claims should be construed as broadly as permissible in view of the prior art.

What we regard as new and desire to secure by Letters Patent is:

1. A process of producing an improved resin which comprises: chemically combining, under application of heat, with a primary infusible insoluble glycerol phthalate resin, materials comprising glycerol and organic acid forming a primary fusible soluble ester having available free hydroxyl groups which in the process enable the chemical combination between said primary glycerol phthalate resin and said primary soluble ester to be effected, said acid being selected from a group consisting of phthalic acid, abietic acid, and a drying oil fatty acid, thereby producing an improved fusible soluble resin.

2. A process as specified in claim 1 as practiced by preparatorily reacting together said materials comprising said glycerol and said organic acid and producing said primary fusible soluble glycerol ester having available hydroxyl groups, and then mixing said primary infusible glycerol phthalate resin and said primary soluble glycerol ester while the latter is in liquid condition and applying heat until said glycerol phthalate resin and said soluble ester have combined to form said improved fusible soluble resin.

3. A process as specified in claim 1 in which said infusible glycerol phthalate resin is taken in proportion not greater than about 66% of the fusible soluble ester having available free hydroxyl groups which is producible from said other materials.

4. A process of producing an improved resin which comprises: causing a reaction between materials comprising phthalic anhydride and glycerol as dominant materials and thereby forming a primary infusible insoluble resin which is insoluble in known solvents; causing a reaction between materials comprising organic acid and glycerol and forming a primary fusible soluble ester having available hydroxyl groups to enable said ester to combine chemically with said primary infusible insoluble resin, said acid having been selected from a group consisting of phthalic acid, abietic acid, and drying oil fatty acid; and combining said primary infusible insoluble resin and said primary soluble ester under the action of heat and forming an improved fusible soluble resin.

5. A process of producing an improved resin which comprises: reacting together under application of heat a primary infusible insoluble glycerol phthalate resin and a primary fusible soluble glycerol ester having available hydroxyl groups to enable said ester and said resin to combine chemically, thereby forming an improved fusible soluble resin.

6. A process of producing a resin solution which comprises: reacting together under application of heat a primary infusible insoluble glycerol phthalate resin and a primary fusible soluble glycerol ester having available hydroxyl groups to enable the reaction to be effected, thereby producing an improved fusible soluble resin; and mixing the improved resin and a solvent therefor.

7. The process specified in claim 1, as practiced by employing phthalic anhydride in producing said primary fusible soluble ester.

8. The process specified in claim 1, as practiced by employing abietic acid in producing said primary fusible ester.

9. The process specified in claim 1, as practiced by employing drying oil fatty acid in producing said primary fusible ester.

10. A process of producing an improved resin which comprises: mixing with a primary fusible soluble glycerol ester, while said ester is in liquid form and at elevated temperature, a primary hard infusible insoluble glycerol phthalate resin in comminuted form, and heating the mixture until reaction, with elimination of water, is effected between said primary ester and said primary resin, said primary ester having available free hydroxyl groups enabling said ester and said resin to combine chemically to form an improved fusible soluble resin.

11. The process stated in claim 10 as practiced by employing said primary ester in the form of a fusible soluble resin which is in molten condition when said primary infusible resin is mixed therewith.

12. A process of producing an improved resin which comprises: reacting together phthalic anhydride and glycerol, the latter taken in proportion not substantially exceeding that of the equimolecular ratio, and forming a primary infusible insoluble resin; and reacting said primary infusible resin, under application of heat, with a primary fusible soluble glycerol ester having available hydroxyl groups to enable the reaction between said primary resin and said primary ester to be effected, thereby forming an improved fusible soluble resin.

13. A process as specified in claim 4 in which said primary infusible glycerol phthalate resin is taken in lesser proportion than said primary fusible soluble ester.

14. An improved fusible soluble resinous reaction product of a primary infusible insoluble glycerol phthalate resin and a primary fusible soluble glycerol ester having available free hydroxyl groups, said improved soluble reaction product having been formed by a reaction in which said available hydroxyl groups enabled said primary fusible soluble ester to combine chemically with said primary infusible insoluble resin.

15. An improved fusible soluble resinous reaction product as specified in claim 14, and a solvent holding said product in solution.

16. An improved fusible soluble resinous reaction product of a primary infusible insoluble glycerol phthalate resin and a primary fusible soluble glycerol-drying oil acid ester having available hydroxyl groups, said primary resin and said primary ester having been condensed together with elimination of water.

17. An improved fusible soluble resinous reaction product of a primary infusible insoluble glycerol phthalate resin and a primary fusible soluble glycerol-abietic acid resin having available hydroxyl groups, said improved reaction product having been formed by condensing said primary resins together and eliminating water.

18. An improved fusible soluble resinous reaction product of a primary infusible insoluble glycerol phthalate resin and a primary fusible soluble glycerol ester formed by a reaction between glycerol and acid selected from a class consisting of drying oil acid and abietic acid, said soluble glycerol ester having available hydroxyl groups and said resin and ester having been condensed together with elimination of water; and a drying oil incorporated with said improved reaction product.

19. A solution of an improved reaction product as specified in claim 18, having a natural resin incorporated therein.

20. An improved ready-mixed paint or varnish comprising a reaction product of a primary infusible glycerol phthalate resin and a fusible soluble glycerol ester having free hydroxyl groups, said ester having been produced by reaction between glycerol and organic acid selected from a class consisting of phthalic acid, abietic acid, and drying oil acid and said resin and ester having been condensed together with elimination of water; a solvent for said reaction product; and a basic pigment.

21. An improved ready-mixed paint or varnish comprising a reaction product of a primary infusible glycerol phthalate resin and a fusible soluble glycerol ester having free hydroxyl groups, said ester having been produced by reaction between glycerol and organic acid selected from a class consisting of phthalic acid, abietic resin, and drying oil acid and said resin and ester having been condensed together with elimination of water; a solvent for said reaction product; and a pulverulent metal.

PAUL M. HENNEGAN.
RAYMOND A. SWAIN.